(12) United States Patent
Steiner et al.

(10) Patent No.: US 10,878,633 B2
(45) Date of Patent: Dec. 29, 2020

(54) AUGMENTED REALITY-BASED MEASURING SYSTEM

(71) Applicant: LEICA GEOSYSTEMS AG, Heerbrugg (CH)

(72) Inventors: Markus Steiner, Gränichen (CH); Michael Lettau, Laufenburg (DE)

(73) Assignee: LEICA GEOSYSTEMS AG, Heerbrugg (CH)

( * ) Notice: Subject to any disclaimer, the term of this patent is extended or adjusted under 35 U.S.C. 154(b) by 0 days.

(21) Appl. No.: 16/406,912

(22) Filed: May 8, 2019

(65) Prior Publication Data
US 2019/0347860 A1 Nov. 14, 2019

(30) Foreign Application Priority Data

May 8, 2018 (EP) ..................................... 18171349

(51) Int. Cl.
| | | |
|---|---|---|
| *G06T 19/00* | (2011.01) | |
| *H04N 13/117* | (2018.01) | |
| *G06K 9/00* | (2006.01) | |
| *G06F 3/01* | (2006.01) | |

(52) U.S. Cl.
CPC ............ *G06T 19/006* (2013.01); *G06F 3/011* (2013.01); *G06K 9/00671* (2013.01); *H04N 13/117* (2018.05)

(58) Field of Classification Search
CPC . G06F 3/011; G06T 190/006; G06K 9/00671; G01B 2210/58; G01B 11/002; G01B 11/005
See application file for complete search history.

(56) References Cited

U.S. PATENT DOCUMENTS

| | | | |
|---|---|---|---|
| 8,902,408 B2 | 12/2014 | Bridges | |
| 10,114,127 B2 * | 10/2018 | Brown | ................ G06F 3/04842 |
| 2019/0094021 A1 * | 3/2019 | Singer | .................... G01C 15/00 |

FOREIGN PATENT DOCUMENTS

| | | |
|---|---|---|
| EP | 2 916 099 A1 | 9/2015 |
| EP | 3 246 660 A1 | 11/2017 |
| WO | 2016/049402 A1 | 3/2016 |

OTHER PUBLICATIONS

Extended European Search Report dated Nov. 26, 2018 as received Application No. 18171349.6.

* cited by examiner

*Primary Examiner* — Laurence J Lee
(74) *Attorney, Agent, or Firm* — Maschoff Brennan

(57) ABSTRACT

An Augmented Reality (AR)-based system includes a mobile sensor, AR device, coordinate measuring machine, and computer. The AR-device includes a camera for capturing an environment, and a display providing a view of the environment and overlays. The coordinate measuring instrument determines a position of the mobile sensor and the AR-device. The computer: controls the camera, provides a reciprocal data connection, provides the AR-data and at least one corresponding identification feature, establishes a referenced status of the AR-device by, in each case, identifying a respective identification feature captured by the camera, determines a pose of the AR-device relative to the respective identification feature, and generates the overlays in the referenced status based on the pose of the AR-device.

19 Claims, 2 Drawing Sheets

AUGMENTED REALITY-BASED MEASURING SYSTEM

CROSS-REFERENCE TO RELATED APPLICATIONS

This application claims priority to European Patent Application No. 18171349, filed on May 8, 2018. The foregoing patent application is incorporated herein by reference.

FIELD OF INVENTION

The present invention relates to an Augmented Reality (AR)-based system comprising a mobile sensor, an Augmented Reality (AR)-device, and a coordinate measuring instrument.

BACKGROUND

A generic coordinate measuring instrument may for example be a laser tracker, a laser scanner, a camera system, an articulated arm coordinate measuring machine (CMM), a tachymeter, a theodolite, a total station, a white light sensor, a search of light sensor, a time of flight measuring system, or a laser radar system. Such coordinate measuring instruments feature single point measurements, in particular represented as three-dimensional single points, point clouds or polygonised meshes, and/or tracking of near and far objects, and operate based on time of flight laser technology, image processing technology, and/or angle encoder technology.

A generic mobile sensor is designed for cooperating with the coordinate measuring instrument, in particular for being tracked by the coordinate measuring instrument. Such mobile sensor may e.g. be a measuring probe, an articulated arm CMM, a scanner, or a multi-camera device, each comprising measuring means for measuring an object.

In particular, the mobile sensor may comprise or may be mounted on an Unmanned Aerial Vehicle (UAV), an Autonomous Guided Vehicle (AGV), or any other kind of vehicle. Accordingly, a specific embodiment of such a mobile sensor may be an articulated arm coordinate measuring machine being mounted on an AGV.

In a special embodiment, the mobile sensor and the coordinate measuring instrument could also be formed as one single device. Such a combination may be embodied as an articulated arm CMM, wherein a hand-held sensor part (e.g. comprising a tactile probe or a laser system) could be interpreted as the mobile sensor and the articulated arm part with its angle encoders could be interpreted as the coordinate measuring instrument.

Setting up such a system and an object to be surveyed, inspected, fitted, adjusted, and/or built with the system in a measuring environment—but also a corresponding process per se (survey, inspection, fitting, adjustment, building)—can be quite complex and time-consuming.

BRIEF DESCRIPTION

Therefore, a system according to some aspects of the invention provide visual support for a user, allowing him to ergonomically accomplish many different (consecutive) tasks, and in particular, providing him an immediate on-site feedback about a measurement/fitting quality.

Some aspects of the invention relate to an Augmented Reality (AR)-based system for the purpose of at least one of surveying, inspecting, fitting, adjusting, and building an object, said system comprising a mobile sensor configured for measuring an object and for being maneuverable, an AR-device comprising a camera configured for capturing an environment of the AR-device, and a display configured for providing a real view of the environment, and overlays onto the real view according to AR-data, said AR-data being spatially associated with the object, and a coordinate measuring instrument configured for determining a position of the mobile sensor and a position of the AR-device, a computer configured for reading and controlling the camera, providing a reciprocal data connection among the AR-device and the coordinate measuring instrument, providing the AR-data and, for each of the mobile sensor, the coordinate measuring instrument, and the object, at least one corresponding identification feature, establishing a referenced status of the AR-device relative to each of the mobile sensor, the coordinate measuring instrument, and the object by, in each case, identifying a respective identification feature captured by the camera, determining a pose of the AR-device relative to the respective identification feature based at least in part on the position of the AR-device determined by the coordinate measuring instrument, and generating the overlays in the referenced status based on the pose of the AR-device relative to at least one of the mobile sensor, the coordinate measuring instrument, and the object. The computer may further be configured for providing a reciprocal data connection among the AR-device and the mobile sensor. In particular, the computer is comprised by the AR-device; however, it could also be comprised by the coordinate measuring instrument, the mobile sensor, or an external device, like a server. The purpose of providing the overlays according to the AR-data may be to support the user of the AR-device who wants to handle the object (e.g. surveying, measuring, inspecting, adjusting, fitting, building, and/or assembling). The overlays could help guiding the user through steps or at least inform him about facts (e.g. quantitative or qualitative measurement results). Generally, the computer may particularly be configured for generating the AR-data at least in part.

The computer may further be configured for maintaining the referenced status of the AR-device relative to at least one of the mobile sensor, the coordinate measuring instrument, and the object even in case of loss of visual contact between the camera and the respective identification feature, based on a Visual Localisation and Mapping (VSLAM)-process making use of structure of the environment.

The system may also comprise a vehicle, wherein the mobile sensor is maneuverable by being arranged on said vehicle. Such vehicle may be embodied as a drone (UAV) or an autonomous vehicle (AGV). In another embodiment of the system, the mobile sensor is maneuverable by being held by a user (preferably the one who is wearing the AR-device).

The AR-data may be based on measuring instructions provided by the computer. In the particular case the computer is comprised by the AR-device, the computer may be configured for receiving the AR-data from at least one of the coordinate measuring instrument and an external computing device. The computer may particularly also be configured for generating the AR-data at least in part. Other AR-data may also be a live image of a camera other than the AR-device's camera, e.g. an external stationary camera, a camera comprised by the coordinate measuring instrument, or a webcam by which a co-worker can be engaged in the inspection process. The measuring instructions can be stored and hence predetermined, but they might as well also be adaptive in that they are based on the behaviour of the user, previous measuring results, the current position of the user/ mobile sensor/object, or other circumstances that may appear during a measuring process.

The measuring instructions may comprise at least one of indications where to place or align the mobile sensor and instructions on how to perform the measurement. For example, in case a feature should be measured which is located on a side of the object facing the subsurface, the instructions may guide the user to turn the object.

The AR-data may be based on measurement data of the object, said measurement data obtained with at least one of the mobile sensor and the coordinate measuring instrument. The computer may further be configured for receiving the AR-data from at least one of the mobile sensor and the coordinate measuring instrument.

The measurement data may comprise a report based on at least one of quantitative measurement results, and qualitative measurement results.

The AR-data may be based on fitting instructions, which are based on measurement data of the object, said measurement data obtained with at least one of the mobile sensor and the coordinate measuring instrument. In the particular case the computer is comprised by the AR-device, the computer may be configured for receiving the AR-data from at least one of the coordinate measuring instrument, the mobile sensor, and an external server.

The mobile sensor may be embodied as one of a measuring probe, articulated arm coordinate measuring machine, a (laser) scanner, and a multi-camera device; and the mobile sensor may be configured for providing a light pattern, wherein the coordinate measuring instrument may be configured for detecting said light pattern and for determining the pose of the mobile sensor based on the detected light pattern. In this way, the light pattern can act as an embodiment of identification feature(s) of the mobile sensor. The detection of the light pattern may be provided by a camera comprised by the coordinate measuring instrument. The light pattern may e.g. be realised by a constellation of light-emitting diodes.

The coordinate measuring instrument may be embodied as one of a laser tracker, a laser scanner, a camera system, an articulated arm coordinate measuring machine, a tachymeter, a theodolite, a total station, a white light sensor, a search of light sensor, a time of flight measuring system, and a laser radar system.

The AR-device may be embodied as one of a tablet computer, a smart phone, AR-glasses, and an AR-helmet, one or more contact lens projectors, or a virtual retinal display (a projector directed towards the human retina).

The computer may be comprised by at least one of the mobile sensor, the coordinate measuring instrument, the AR-device, and an external computing device (such as a server, or laptop).

At least one of the mobile sensor, the coordinate measuring instrument, and the AR-device may comprise a wireless communication module allowing for exchanging data (allowing for said reciprocal data connection). In the particular case, the computer is comprised by an external device (server or the like) said external device may comprise a wireless communication module.

Each of said identification features may be embodied as at least one of a coded pattern (light pattern or colour pattern, e.g. QR-code sticker), a 3D-CAD-model, and an image.

Some aspects of the invention also relate to a method of providing visual support for a user who is at least one of surveying, inspecting, fitting, adjusting, and building an object with a system according to the description herein, said method comprising the steps:

providing a reciprocal data connection among the AR-device and the coordinate measuring instrument, providing the AR-data and, for each of the mobile sensor, the coordinate measuring instrument, and the object, at least one corresponding identification feature, establishing a referenced status of the AR-device relative to each of the mobile sensor, coordinate measuring instrument, and the object by, in each case,
identifying a respective identification feature captured by the camera,
determining a pose of the AR-device relative to the identification feature based at least in part on the position of the AR-device determined by the coordinate measuring instrument, and generating the overlays in the referenced status based on the pose of the AR-device relative to at least one of the mobile sensor, the coordinate measuring instrument, and the object.

The method may further comprise the step of maintaining the referenced status of the AR-device relative to at least one of the coordinate measuring instrument and the object even in case of loss of visual contact between the camera and the respective identification feature, based on a Visual Localisation and Mapping (VSLAM)-process making use of structure of the environment.

The method may further comprise the step of providing a vehicle, wherein the mobile sensor is maneuverable by being arranged on said vehicle.

The method may further comprise the step of receiving, with the AR-device, the AR-data from at least one of the mobile sensor, the coordinate measuring instrument, and an external server. In particular the computer is generating the AR-data at least in part.

The method may further comprise the step of providing a light pattern which the coordinate measuring instrument can detect, and based on which the coordinate measuring instrument can determine the pose of the mobile sensor.

BRIEF DESCRIPTION OF THE DRAWINGS

In the following, the invention will be described in detail by referring to exemplary embodiments that are accompanied by figures, in which.

DETAILED DESCRIPTION

Figure 1:
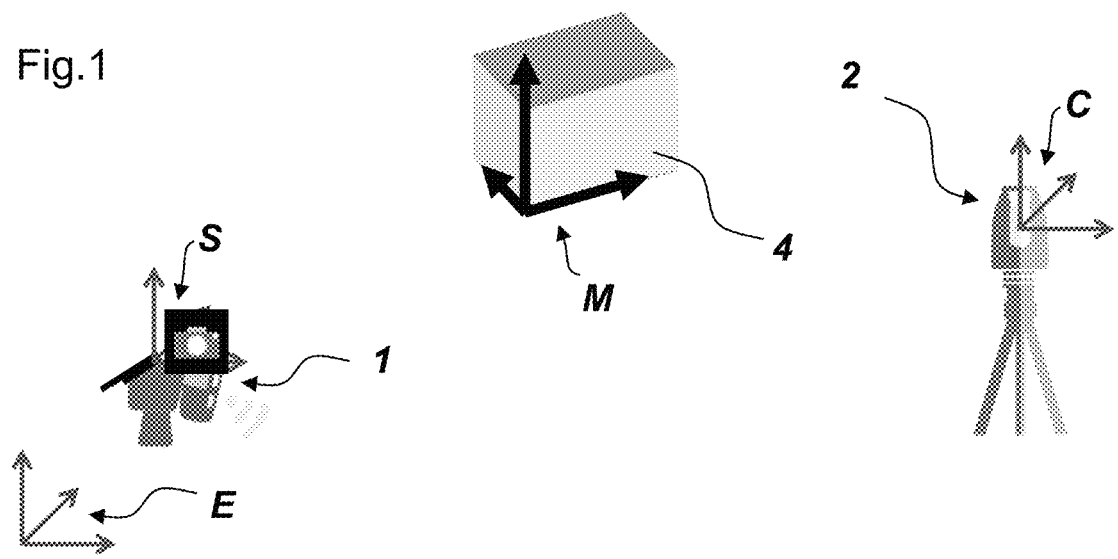
FIG. 1: shows an overview of the components of a system according to the invention, that is a mobile sensor, a coordinate measuring instrument, and an AR-device; the system is configured for inspecting a object in a measuring environment.

FIG. 1 shows the components of an embodiment of a system according to the invention: A mobile sensor 1, a coordinate measuring instrument 2, an AR-device 3, and a computer (in this case: comprised by the AR-device).

The instrument 2 (coordinate system C) is placed into an environment (coordinate system E), such that coordinate systems C and E have a fixed spatial relationship in the setup. Also measuring object 4 (coordinate system M) is placed into said environment, thereby as well establishing a fixed spatial relationship between the coordinate systems M and E.

A user may wear the AR-device 3 (coordinate system A), such as goggles or an HMD (Head Mounted Display), and hold the mobile sensor 1 (coordinate system S) in his hand. Coordinate systems A and S therefore dynamically change their pose relative to the environment (coordinate system E) as well as relative to the measuring object (coordinate system M) and to the coordinate measuring instrument (coordinate system C).

The sensor 1 and the coordinate measuring instrument 2 in combination are configured to inspect/measure the measuring object 4. The coordinate measuring instrument 2 is configured for determining the position, in particular and also the orientation, of the sensor 1. The sensor 1 itself provides an "extensional" link to the measuring object 4. For example, the sensor 1 can be embodied as a probing device.

Figure 2:
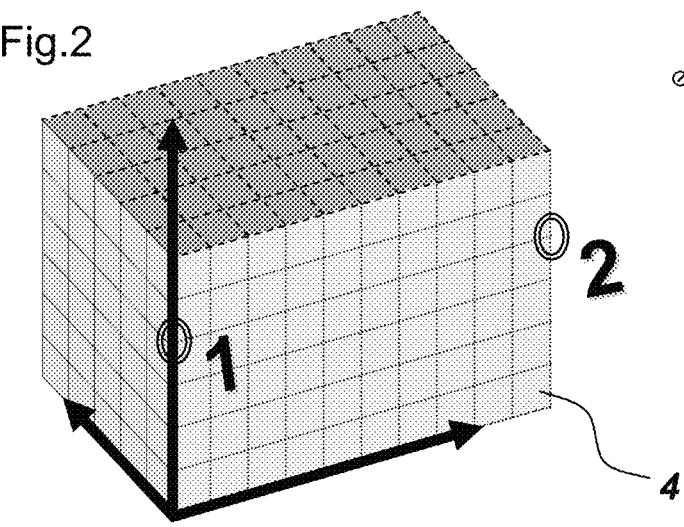
FIG. 2: shows an embodiment of the system with the involvement of exemplary AR-data for supporting an inspection task.
Figure 3:
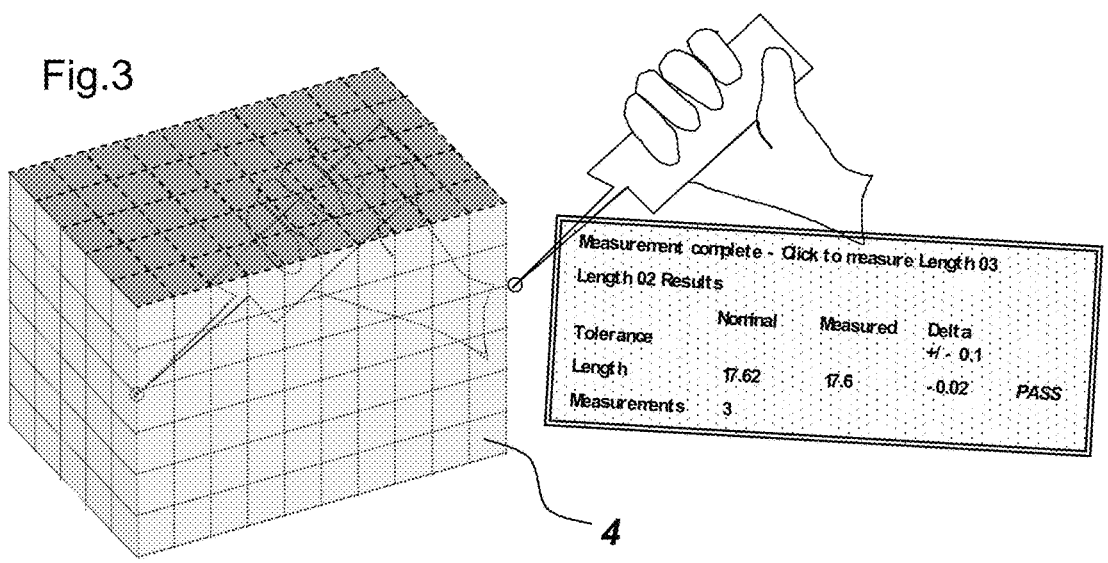
FIG. 3: shows a later phase of the inspection task of FIG. 2.
Figure 4:
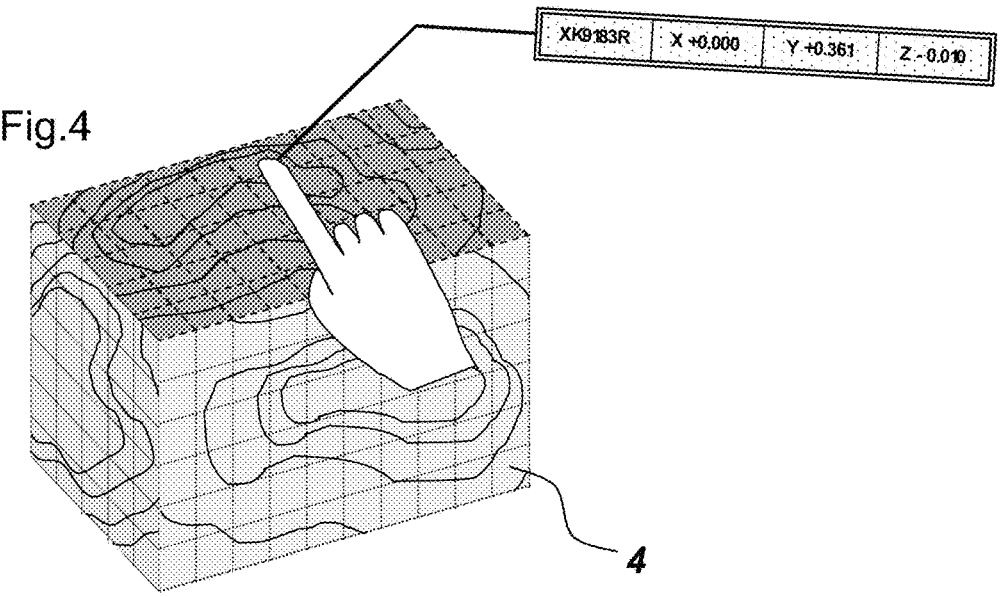
FIG. 4: shows an interaction of a user of an embodiment of the system with the involvement of exemplary AR-data for supporting an inspection task.

In this particular case, which FIGS. 2, 3, and 4 are also relating to, the instrument 2 can derive the coordinate of the probing tip of the mobile sensor 1 by determining its position and orientation and by knowing the length of the probing tip. For example, the probing device can emit a light pattern (as identification feature(s)) which is detectable by the instrument 2. By the perception of the light pattern, the instrument 2 can derive the pose of the sensor 1.

In other embodiments, the sensor 1 may be a scanner which works based on multiple cameras and/or laser. The sensor 1 may also be a flying sensor (e.g. multicopter drone with a measuring device) capable of reaching spots of a measuring object impassable for a user, such as elements of an aircraft. Said flying sensor then may comprise above mentioned technology for measuring the object.

The sensor 1 has a communicative link to the instrument 2 and can be configured, e.g. by a click-button, to trigger a measurement. The instrument 2 is thereby "instructed" to perform a precise measurement of the position and orientation of the sensor. Depending on the embodiment of the sensor 1, the dimension of the sensor (probing device) or an additional measurement performed by the sensor (as a scanner itself) can be taken into account during the measurement. As a result, the measuring object 4 is precisely measured by the system.

By the computer, which is configured for processing the video stream captured by the camera of the AR-device 3, a pose of the AR-device 3 relative to each of the coordinate measuring instrument 2 and the measuring object 4 is determined. In particular, a relative pose between the AR-device 3 and the sensor 1 is determined as well, e.g. based on image processing. Furthermore, the named components can communicate with each other, i.e. a reciprocal data connection is provided. By that, a user wearing the AR-device 3 can for example be provided with measured data or measurement evaluations sent by the instrument 2 or by an external computer. In the referenced status of the AR-device 3 relative to the measuring object 4, the AR-device 3 can provide overlays spatially assigned to locations of the measuring object 4 according to AR-data, which AR-data which can be stored on or received by the AR-device 3. For this purpose, the AR-device 3 may comprise a data storage unit or a wired/wireless communication module.

FIG. 2 shows a measuring object 4 with some overlays depicted by the display of the AR-device. A first exemplary overlay is the grid that spans over the object 4, which can also be a CAD-model of the object. A second exemplary overlay is the set of arrows that indicate the origin of the coordinate system M. A third example of overlays are the two circles numbered with "1" and "2" indicating an order of spots to be measured. The circles and in particular also the numbers of the circles are spatially linked with the geometry of the object 4, so that the overlays adapt within the display in order to be perceived by the user as if they remain at the assigned location on the object even when the user turns his view to the side or up/down. By the indications, the user is instructed to measure the spots "1" and "2" with the sensor 1 which is exemplarily shown as probing device. The overlays may e.g. also be a video stream showing animated instructions for the bearer of the AR-device.

The mobile sensor 1 can be tracked by the instrument 2 (not shown), wherein position and in particular also orientation of the probing device can be determined relative to the instrument. Hence, the 3D coordinates of the tip of the probing device relative to the coordinate system of the instrument 2 can be derived.

FIG. 3 shows by the dashed lines that point "1" has been measured already and point "2" is being measured right now. The sensor 1 is configured for triggering a measurement, for example by a click button, which may send out a signal to the instrument 2 to record the currently measured coordinate of the measuring tip. Overlays according to corresponding AR-data can be displayed on the AR-device. The AR-data relate to the measured data and may in particular comprise evaluations about the quality of the data, e.g. whether the measured point is within a certain tolerance.

FIG. 4 shows overlays based on further exemplary AR-data, such as a pseudo colour image (indicated in the figure with isolines) which correspond to the quality of measurement data already obtained. A further exemplary functionality is displaying of a specific point on the object surface, which can for example be selected by the hand of the user. The camera of the AR-device is observing the gestures of the hand and can detect certain predetermined triggering gestures. For example, if the forefinger is doing a tipping movement, the computer will detect the request for predetermined data linked to the spot on the measuring object 4 which the forefinger is pointed at.

Figure 5:
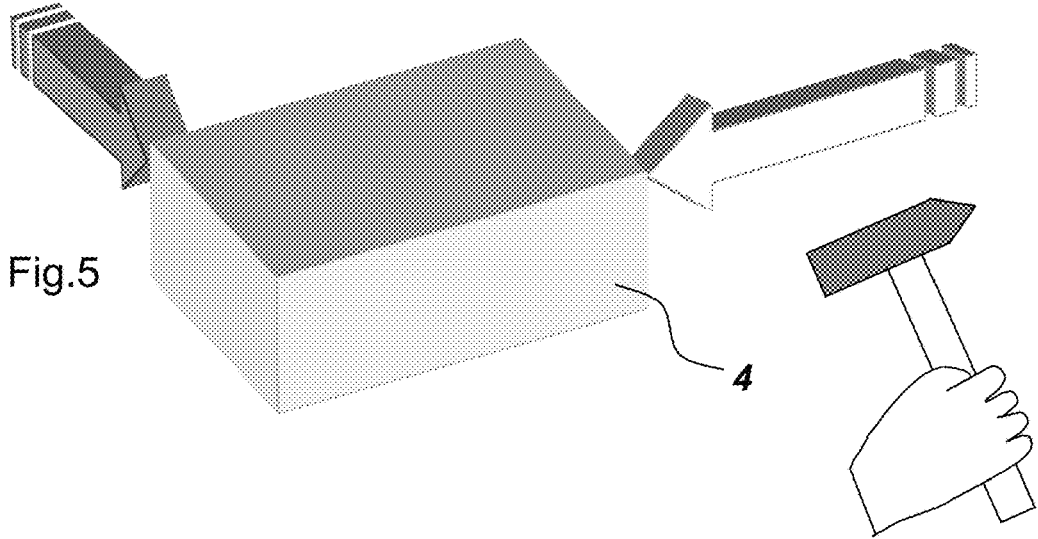
FIG. 5: shows an interaction of a user of an embodiment of the system with the involvement of exemplary AR-data for supporting a fitting task subsequent to an inspection task.

FIG. 5 shows an object 4 and overlays based on further exemplary AR-data. The AR-data shown in this embodiment indicate fitting instructions or adjusting instructions to the user.

For example, the object has been mounted at a specific place. The AR-data may be based on measurement data of the measuring object obtained with the sensor in combination with the coordinate measuring instrument. The measurement data relate to a pose of the object relative to a reference, e.g. the environment or another part which the object is fitted to. In case an evaluation of the measurement data results in an incorrect positioning of the object, the overlays could be (as shown in the figure) embodied as arrows which indicate a user to fit the object by means of a hammer into a certain direction. The pose of the object may be observed by at least one of the camera of the AR-device, the sensor, and the coordinate measuring instrument, such that the arrows may disappear in case the object has acquired a correct pose. The overlaid arrows may also increase/decrease in size based on how close pose of the object is to the target pose.

Although the invention is illustrated above, partly with reference to some preferred embodiments, it must be understood that numerous modifications and combinations of different features of the embodiments can be made. All of these modifications lie within the scope of the appended claims.

What is claimed is:

1. An Augmented Reality (AR)-based system comprising:
a mobile sensor configured for measuring an object and for being maneuverable;
an AR-device comprising:
a camera configured for capturing an environment of the AR-device, and
a display configured for providing:
a real view of the environment, and
overlays onto the real view according to AR-data, said AR-data being spatially associated with the object,
a coordinate measuring instrument configured for determining a position of the mobile sensor and a position of the AR-device; and
a computer configured for:
reading and controlling the camera,
providing a reciprocal data connection among the AR-device and the coordinate measuring instrument,
providing the AR-data and, for each of the mobile sensor, the coordinate measuring instrument, and the object, at least one corresponding identification feature,
establishing a referenced status of the AR-device relative to each of the mobile sensor, the coordinate measuring instrument, and the object by, in each case,
identifying a respective identification feature captured by the camera,
determining a pose of the AR-device relative to the respective identification feature based at least in part on the position of the AR-device determined by the coordinate measuring instrument,
maintaining the referenced status of the AR-device relative to at least one of the mobile sensor, the coordinate measuring instrument, and the object in case of loss of visual contact between the camera and the respective identification feature, based on a Visual Localisation and Mapping (VSLAM)-process making use of structure of the environment, and
generating the overlays in the referenced status based on the pose of the AR-device relative to at least one of the mobile sensor, the coordinate measuring instrument, and the object.

2. The AR-based system according to claim 1, further comprising:
a vehicle, wherein the mobile sensor is maneuverable by being arranged on said vehicle.

3. The AR-based system according to claim 1, wherein the AR-data are based on measuring instructions provided by the computer.

4. The AR-based system according to claim 3, wherein the measuring instructions comprise at least one of:
indications where to place or align the mobile sensor, and
instructions on how to perform the measurement.

5. The AR-based system according to claim 1, wherein the AR-data is based on measurement data of the object, said measurement data obtained with at least one of the mobile sensor and the coordinate measuring instrument.

6. The AR-based system according to claim 5, wherein the measurement data comprise a report based on at least one of quantitative measurement results, and
qualitative measurement results.

7. The AR-based system according to claim 1, wherein the AR-data are based on fitting instructions, which are based on measurement data of the object, said measurement data obtained by at least one of the mobile sensor and the coordinate measuring instrument.

8. The AR-based system according to claim 1, wherein the mobile sensor is:
embodied as one of a measuring probe, articulated arm coordinate measuring machine, a scanner, and a multi-camera device, and
configured for providing a light pattern, and
wherein the coordinate measuring instrument is configured for:
detecting the light pattern, and
determining the pose of the mobile sensor based on the detected light pattern.

9. The AR-based system according to claim 1, wherein the coordinate measuring instrument is embodied as one of a laser tracker, a laser scanner, a camera system, an articulated arm coordinate measuring machine, a tachymeter, a theodolite, a total station, a white light sensor, a search of light sensor, a time of flight measuring system, or a laser radar system.

10. The AR-based system according to claim 1, wherein the AR-device is embodied as one of a tablet computer, a smart phone, AR-glasses, an AR-helmet, one or more contact lens projectors, or a virtual retinal display.

11. The AR-based system according to claim 1, wherein the computer is comprised by at least one of the mobile sensor, the coordinate measuring instrument, the AR-device, and an external computing device.

12. The AR-based system according to claim 1, wherein at least one of the mobile sensor, the coordinate measuring instrument, and the AR-device comprise a wireless communication module allowing for exchanging data.

13. The AR-based system according to claim 1, wherein each identification feature is embodied as at least one of a coded pattern, a 3D-CAD-model, and an image.

14. A method of providing visual support for a user using a system, the method comprising:
providing an Augmented Reality (AR)-based system comprising:
a mobile sensor configured for measuring an object and for being maneuverable manoeuvrable;
an AR-device comprising:
a camera configured for capturing an environment of the AR-device, and
a display configured for providing:
a real view of the environment, and
overlays onto the real view according to AR-data, said AR-data being spatially associated with the object, and
a coordinate measuring instrument configured for determining a position of the mobile sensor and a position of the AR-device; and
a computer configured for:
reading and controlling the camera,
providing a reciprocal data connection among the AR-device and the coordinate measuring instrument,
providing the AR-data and, for each of the mobile sensor, the coordinate measuring instrument, and the object, at least one corresponding identification feature, establishing a referenced status of the AR-device relative to each of the mobile sensor, the coordinate measuring instrument, and the object by, in each case,
identifying a respective identification feature captured by the camera,
determining a pose of the AR-device relative to the respective identification feature based at least in part on the position of the AR-device determined by the coordinate measuring instrument, and
maintaining the referenced status of the AR-device relative to at least one of the mobile sensor, the coordinate measuring instrument, and the object in case of loss of visual contact between the camera and the respective identification feature, based on a Visual Localisation and Mapping (VSLAM)-process making use of structure of the environment, and
generating the overlays in the referenced status based on the pose of the AR-device relative to at least one of the mobile sensor, the coordinate measuring instrument, and the object; and
providing a reciprocal data connection among the AR-device and the coordinate measuring instrument;
providing the AR-data and, for each of the mobile sensor, the coordinate measuring instrument, and the object, at least one corresponding identification feature;
establishing a referenced status of the AR-device relative to each of the mobile sensor, the coordinate measuring instrument, and the object by, in each case:
identifying a respective identification feature captured by the camera,
determining a pose of the AR-device relative to the respective identification feature based at least in part on the position of the AR-device determined by the coordinate measuring instrument, and
generating the overlays in the referenced status based on the pose of the AR-device relative to at least one of the mobile sensor, the coordinate measuring instrument, and the object.

15. An Augmented Reality (AR)-based system comprising:
a mobile sensor configured for measuring an object and for being maneuverable;
an AR-device comprising:
a camera configured for capturing an environment of the AR-device, and
a display configured for providing:
a real view of the environment, and
overlays onto the real view according to AR-data, said AR-data being spatially associated with the object,
a coordinate measuring instrument configured for determining a position of the mobile sensor and a position of the AR-device; and
a computer configured for:
reading and controlling the camera,
providing a reciprocal data connection among the AR-device and the coordinate measuring instrument,
providing the AR-data and, for each of the mobile sensor, the coordinate measuring instrument, and the object, at least one corresponding identification feature,
establishing a referenced status of the AR-device relative to each of the mobile sensor, the coordinate measuring instrument, and the object by, in each case,
identifying a respective identification feature captured by the camera,
determining a pose of the AR-device relative to the respective identification feature based at least in part on the position of the AR-device determined by the coordinate measuring instrument, and
generating the overlays in the referenced status based on the pose of the AR-device relative to at least one of the mobile sensor, the coordinate measuring instrument, and the object,
wherein the mobile sensor is:
embodied as one of a measuring probe, articulated arm coordinate measuring machine, a scanner, and a multi-camera device, and
configured for providing a light pattern, and
wherein the coordinate measuring instrument is configured for:
detecting the light pattern, and
determining the pose of the mobile sensor based on the detected light pattern.

16. The AR-based system according to claim 15, wherein the computer is further configured for maintaining the referenced status of the AR-device relative to at least one of the mobile sensor, the coordinate measuring instrument, and the object in case of loss of visual contact between the camera and the respective identification feature, based on a Visual Localisation and Mapping (VSLAM)-process making use of structure of the environment.

17. The AR-based system according to claim 15, wherein the AR-data are based on:
measuring instructions provided by the computer, wherein the measuring instructions comprise at least one of:
indications where to place or align the mobile sensor, and
instructions on how to perform the measurement; or
measurement data of the object, said measurement data obtained with at least one of the mobile sensor and the coordinate measuring instrument, wherein the measurement data comprise a report based on at least one of quantitative measurement results, and qualitative measurement results; or
fitting instructions, which are based on measurement data of the object, said measurement data obtained by at least one of the mobile sensor and the coordinate measuring instrument.

18. The AR-based system according to claim 15, wherein:
the coordinate measuring instrument is embodied as one of a laser tracker, a laser scanner, a camera system, an articulated arm coordinate measuring machine, a tachymeter, a theodolite, a total station, a white light sensor, a search of light sensor, a time of flight measuring system, or a laser radar system;
the AR-device is embodied as one of a tablet computer, a smart phone, AR-glasses, an AR-helmet, one or more contact lens projectors, or a virtual retinal display;
the computer is comprised by at least one of the mobile sensor, the coordinate measuring instrument, the AR-device, and an external computing device;
at least one of the mobile sensor, the coordinate measuring instrument, and the AR-device comprise a wireless communication module allowing for exchanging data; or
each identification feature is embodied as at least one of a coded pattern, a 3D-CAD-model, and an image.

19. A method of providing visual support for a user using a system, the method comprising:

providing an Augmented Reality (AR)-based system comprising:
  a mobile sensor configured for measuring an object and for being maneuverable;
  an AR-device comprising:
    a camera configured for capturing an environment of the AR-device, and
    a display configured for providing:
      a real view of the environment, and
      overlays onto the real view according to AR-data, said AR-data being spatially associated with the object,
  a coordinate measuring instrument configured for determining a position of the mobile sensor and a position of the AR-device; and
  a computer configured for:
    reading and controlling the camera,
    providing a reciprocal data connection among the AR-device and the coordinate measuring instrument,
    providing the AR-data and, for each of the mobile sensor, the coordinate measuring instrument, and the object, at least one corresponding identification feature,
    establishing a referenced status of the AR-device relative to each of the mobile sensor, the coordinate measuring instrument, and the object by, in each case,
      identifying a respective identification feature captured by the camera,
      determining a pose of the AR-device relative to the respective identification feature based at least in part on the position of the AR-device determined by the coordinate measuring instrument, and
    generating the overlays in the referenced status based on the pose of the AR-device relative to at least one of the mobile sensor, the coordinate measuring instrument, and the object,
  wherein the mobile sensor is:
    embodied as one of a measuring probe, articulated arm coordinate measuring machine, a scanner, and a multi-camera device, and
    configured for providing a light pattern, and
  wherein the coordinate measuring instrument is configured for:
    detecting the light pattern, and
    determining the pose of the mobile sensor based on the detected light pattern; and
providing a reciprocal data connection among the AR-device and the coordinate measuring instrument;
providing the AR-data and, for each of the mobile sensor, the coordinate measuring instrument, and the object, at least one corresponding identification feature;
establishing a referenced status of the AR-device relative to each of the mobile sensor, the coordinate measuring instrument, and the object by, in each case:
  identifying a respective identification feature captured by the camera,
  determining a pose of the AR-device relative to the respective identification feature based at least in part on the position of the AR-device determined by the coordinate measuring instrument, and
generating the overlays in the referenced status based on the pose of the AR-device relative to at least one of the mobile sensor, the coordinate measuring instrument, and the object.

\* \* \* \* \*